United States Patent
Jiang et al.

(10) Patent No.: US 12,510,517 B2
(45) Date of Patent: Dec. 30, 2025

(54) SYSTEM AND METHOD FOR DETECTING FLUID MIXTURE

(71) Applicant: TSINGHUA UNIVERSITY, Beijing (CN)

(72) Inventors: Peixue Jiang, Beijing (CN); Yinhai Zhu, Beijing (CN); Yusen Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 294 days.

(21) Appl. No.: 18/506,428

(22) Filed: Nov. 10, 2023

(65) Prior Publication Data
US 2024/0159719 A1    May 16, 2024

(30) Foreign Application Priority Data
Nov. 11, 2022   (CN) .......................... 202211415405.2

(51) Int. Cl.
*G01N 30/32*   (2006.01)
*G01N 30/02*   (2006.01)
*G01N 30/78*   (2006.01)

(52) U.S. Cl.
CPC ....... *G01N 30/32* (2013.01); *G01N 2030/025* (2013.01); *G01N 30/78* (2013.01)

(58) Field of Classification Search
CPC ........ G01N 30/24; G01N 30/32; G01N 30/78; G01N 2030/025
See application file for complete search history.

(56) References Cited

U.S. PATENT DOCUMENTS

| | | | | |
|---|---|---|---|---|
| 3,366,149 A | * | 1/1968 | Taft | G01N 30/24 422/89 |
| 8,297,135 B2 | * | 10/2012 | Trapp | G01N 30/20 73/866 |
| 2012/0118144 A1 | * | 5/2012 | Cates | G01N 1/2273 96/102 |

FOREIGN PATENT DOCUMENTS

CN      111781024      10/2020

OTHER PUBLICATIONS

CNIPA, First Office Action for CN Application No. 202211415405. 2, Nov. 15, 2024.

* cited by examiner

*Primary Examiner* — Justin N Olamit
(74) *Attorney, Agent, or Firm* — Hodgson Russ LLP

(57) ABSTRACT

A system and method for detecting a fluid mixture are provided. The system includes a pipeline assembly, a first valve, a gas chromatograph and a vacuum pump. The pipeline assembly includes a first pipeline and a second pipeline. The first valve is connected to the first pipeline and controls a flow of the fluid mixture obtained from a reaction in a reactor. The gas chromatograph is provided with a sample injection end and a sample output end, where the sample injection end is connected to an end of the first pipeline away from the first valve; and the sample output end is connected to the second pipeline. The vacuum pump is connected to an end of the second pipeline away from the gas chromatograph.

12 Claims, 1 Drawing Sheet

SYSTEM AND METHOD FOR DETECTING FLUID MIXTURE

CROSS-REFERENCE TO RELATED APPLICATIONS

This application claims priority to the Chinese Patent Application No. 202211415405.2, filed on Nov. 11, 2022, the entire disclosure of which is incorporated herein by reference.

FIELD

The present disclosure relates to the field of fluid detection technology, specifically relates to a system and method for detecting a fluid mixture.

BACKGROUND

A fluid mixture resulted from a chemical reaction in a reactor is usually separated and detected by gas or liquid chromatography technology, where an error may generally occur during measurement by off-line detection of injected components on the basis of cooling depressurization and gas-liquid separation. As an example, a pyrolysis product in a reactor at high-temperature or high-temperature and high-pressure will continue subject to a pyrolysis reaction under a preset-deviated operating condition during a delay period from the pyrolysis product starting to cool down to the pyrolysis product having been cooled down, thus resulting in deviated conversion of a raw material upon off-line sample injection and deviated distribution of components in the pyrolysis product, if with a large ratio of the delay period to a program heating period in the reactor, thus resulting in a cooling delay caused error. As another example, partial dissolution of a gas-phase component in a liquid-phase component results in a lower gas yield obtained by measurement of a mass flow of the gas-phase component and a deviated yield of the gas-phase component acquired by measurement of the gas-phase component, due to strong solubility of the gas-phase component in the liquid-phase component at room temperature under atmosphere pressure, thus resulting in a gas-dissolved-in-liquid caused error during measurement. In addition, a portion of the liquid-phase component, which after being cooled is of a boiling point close to the room temperature or exhibits strong volatility, will escape from the liquid-phase component together with a portion of the gas-phase component dissolved in the liquid-phase component during sample injection and detection after gas-liquid separation, thus leading to an evaporation caused error during measurement.

SUMMARY

The present disclosure provides in embodiments a method for detecting a fluid mixture, thereby minimizing an error occurring during measurement in the related art.

The present disclosure provides in embodiment a method for detecting a fluid mixture by a detection system, wherein the detection system includes a pipeline assembly, including a first pipeline and a second pipeline; a first valve, connected to the first pipeline and controlling a flow of the fluid mixture obtained from a reaction in a reactor; a gas chromatograph, provided with a sample injection end connected to an end of the first pipeline away from the first valve and a sample output end connected to the second pipeline; a vacuum pump, connected to an end of the second pipeline away from the gas chromatograph; and a pulse power supply, connected to the first valve, wherein the method includes turning-off the first valve; vacuuming the first pipeline, the gas chromatograph, and the second pipeline with the vacuum pump; turning-on and turning-off the first valve alternately at a frequency of 1-10 Hz by the pulse power supply having a pulse signal with a pulse width less than 10 ms, enabling the fluid mixture to enter the first pipeline for flashing into a gas mixture; and detecting the gas mixture with the gas chromatograph online.

In some embodiments, the detection system further includes a first pressure sensor, arranged at the first pipeline and located between the first valve and the gas chromatograph; and a second pressure sensor, arranged at the second pipeline and located between the vacuum pump and the gas chromatograph, wherein the first pressure sensor and the second pressure sensor respectively arranged at the sample injection end and the sample output end of the gas chromatograph, wherein after vacuuming the first pipeline, the gas chromatograph, and the second pipeline with the vacuum pump, the method further includes monitoring a pressure value in the pipeline assembly by the first pressure sensor and the second pressure sensor.

In some embodiments, the detection system further includes: a second valve, arranged at the second pipeline and located between the vacuum pump and the gas chromatograph; and a heating element, arranged at the first valve, the pipeline assembly, the gas chromatograph, and the second valve to heat their respective surfaces in contact with the fluid mixture, wherein the method further includes: heating respective surfaces of the first valve, the pipeline assembly, the gas chromatograph and the second valve by the heating element to a set preheating temperature; and maintaining the temperature constant.

In some embodiments, the detection system further includes a third pipeline, having a first end connected to the first pipeline and a second end connected to the second pipeline; and a third valve, arranged at the third pipeline, wherein during vacuuming the first pipeline, the gas chromatograph, and the second pipeline with the vacuum pump, the method further includes: turning on the third valve to reduce the pressure value in the pipeline assembly.

In some embodiments, the detection system further includes an additional heating element arranged at the first pressure sensor, the second pressure sensor, the third valve and the third pipeline, wherein the method further includes heating respective surfaces of the first pressure sensor, the second pressure sensor, the third valve and the third pipeline by the additional heating element to a set preheating temperature, and maintaining the temperature constant.

In some embodiments, the detection system further includes a syringe, having a first end inserted into the reactor and a second end connected to the first valve; and a cooler, sleeving around the syringe, wherein before turning-on and turning-off the first valve alternately, the method further includes cooling the fluid mixture to a temperature of 473K or below by the cooler.

In some embodiments, turning-on and turning-off the first valve alternately further includes keeping the vacuum pump operating, and adjusting a threshold pressure of the second valve to be lower than a saturated vapor pressure of a component with a highest boiling point in the fluid mixture, thereby driving the first valve 21 to turn-on and turn-off alternately.

In some embodiments, detecting the gas mixture with the gas chromatograph online further includes monitoring the pressure values upstream and downstream of the gas chromatograph achieving balance by the first pressure sensor and the second pressure sensor; and detecting the gas mixture with the gas chromatograph online.

In some embodiments, the gas chromatograph is provided with at least two channels for synchronous analysis of different components, and two ends of each channel are connected to the first pipeline and the second pipeline respectively, wherein detecting the gas mixture with the gas chromatograph online further includes analyzing the different components with different boiling points in the fluid mixture synchronously in respective channels of the gas chromatograph.

In some embodiments, the second valve is a one-way valve with a flow direction from the gas chromatograph to the vacuum pump along the second pipeline.

In some embodiments, the gas chromatograph is provided with three channels equipped with a gas chromatography-mass spectrometry-hydrogen ion flame detector, a gas chromatography-hydrogen ion flame detector, and a gas chromatography-thermal conductivity detector respectively for synchronous analysis of different components.

In some embodiments, the at least two channels each are further equipped with an identical volumetric apparatus, wherein detecting the gas mixture with the gas chromatograph online further includes injecting the gas mixture into respective channels from the identical volumetric apparatus; and analyzing the different components with different boiling points in the fluid mixture synchronously in respective channels of the gas chromatograph.

According to embodiments of the present disclosure, the method includes turning off the first valve, vacuuming the pipeline assembly and the gas chromatograph with the vacuum pump, and turning on the first valve, thus resulting in a pressure difference between upstream and downstream of the first valve that enables the fluid mixture to enter the first pipeline quickly due to a lower pressure of the first pipeline downstream of the first valve, i.e., at a side of the first valve that its valve core faces the gas chromatograph; or reduces cooling time for the gas mixture from the reactor at high-temperature or high-temperature and high-pressure, thus avoiding the cooling delay caused error. Further, liquid in the fluid mixture (as a gas-liquid mixture) will be flashed into gas under a suddenly-reduced pressure when the fluid mixture enters the first pipeline with the lower pressure, such that the fluid mixture is turned into a gas mixture, thus preventing a portion of the gas-phase component from dissolving in the liquid-phase component, and thereby avoiding the gas-dissolved-in-liquid caused error. Moreover, the fluid mixture is of a reduced boiling point under the lower pressure, thus preventing the evaporation caused error where the component with a boiling point close to room temperature or exhibiting strong volatility is inhibited from evaporation and escape, such that all the fluid mixture obtained from the reaction is gasified and directly injected into the gas chromatograph, thereby achieving online detection by the gas chromatography with minimized error occurring during measurement.

Figure 1:
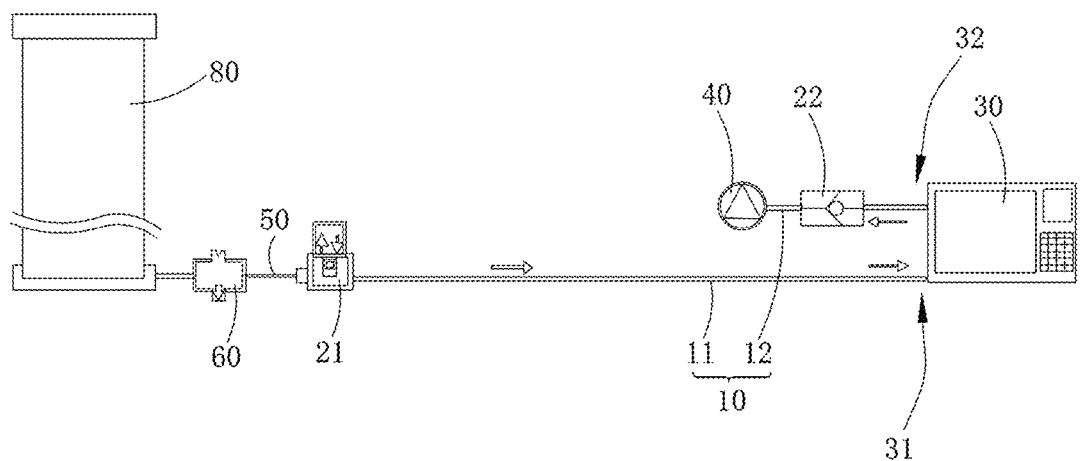
FIG. 1 is a schematic diagram showing a system for detecting a fluid mixture in some embodiments of the present disclosure.

REFERENCE SIGNS a pipeline assembly 10; a first pipeline 11; a second pipeline 12; a third pipeline 13; a first valve 21; a gas chromatograph 30; a sample injection end 31; a sample output end 32; a vacuum pump 40; a syringe 50; a cooler 60; a second valve 22; a third valve 23; a first pressure sensor 71; a second pressure sensor 72; and a reactor 80.

DETAILED DESCRIPTION

Reference will be made in detail to embodiments of the present disclosure to make the solved technical problems, technical solutions, and beneficial effects of the present disclosure more clear comprehensible. It should be understood that the specific embodiments described herein are only used to generally explain the present disclosure. The embodiments shall not be construed to limit the present disclosure.

For simplicity, the present disclosure only explicitly discloses some numerical ranges. However, any lower limit can be combined with any upper limit to form an undefined range; and any lower limit can be combined with other lower limits to form an undefined range, similarly, any upper limit can be combined with any other upper limit to form an undefined range. In addition, although not explicitly documented, each point or individual value between the endpoints of the range is included within that range. Therefore, each point or individual value can serve as its own lower or upper limit, combined with any other points or individual value, or combined with other lower or upper limits to form an undefined range.

In the description of the present disclosure, it should be noted that unless otherwise specified, "a" or "an" means one or more; "several" refers to two or more; "above" and "below" include number itself; the terms of "up", "down", "inside", "outside" indicate the orientation or positional relationship based on the orientation or positional relationship shown in the drawings, only for the convenience and simplification of description, rather than indicating or implying that the device or component referred to must have a specific orientation, be constructed and operated in a specific orientation, and therefore cannot be understood as a limitation of the present disclosure.

The summary of the present disclosure is not intended to describe every disclosed embodiment or implementation of the present disclosure. The following descriptions provide more specific examples of exemplary embodiments. Guidance has been provided through a series of embodiments throughout the entire application, which can be used in various combinations. In each example, the enumeration is only a representative group and should not be interpreted as exhaustion.

Pyrolysis of an organic matter under high-temperature and high-pressure has been widely applied in the field such as waste-to-energy conversion and aerospace thermal protection, where detection of components in a pyrolysis product with significantly different boiling points under high-temperature and high-pressure is the premise of development in the related art. However, conventional off-line detection of injected components on the basis of cooling depressurization and gas-liquid separation will results in a gas-dissolved-in-liquid caused error, an evaporation caused error, and a cooling delay caused error, thus leading an adverse influence on research precise of a pyrolysis reaction mechanism model.

The phrase "cooling delay caused error" used herein refers that a pyrolysis product in a reactor at high-temperature (or high-temperature and high-pressure) will continue subject to a pyrolysis reaction under a preset-deviated operating condition during a delay period from the pyrolysis product starting to cool down to the pyrolysis product having been cooled down when the pyrolysis reaction is finished completely, thus resulting in deviated conversion of a raw material upon off-line sample injection and deviated distribution of components in the pyrolysis product, if with a large ratio of the delay period to a program heating period in the reactor. The cooling delay caused error is directly related to the delay period that is consumed by cooling, and varies in different experiments depending on different experimental systems and operating conditions designed in different institutions.

The phrase "gas-dissolved-in-liquid caused error" used herein refers that partial dissolution of a gas-phase component in a liquid-phase component results in a lower gas yield obtained by measurement of a mass flow of the gas-phase component and a deviated yield of the gas-phase component acquired by measurement of the gas-phase component, due to strong solubility of the gas-phase component in the liquid-phase component both of which are generated by the pyrolysis of an organic matter at room temperature under atmosphere pressure. For example, gaseous C4– hydrocarbons are well dissolved in liquid C5+ hydrocarbons at room temperature under atmosphere pressure because of high similarity-compatibility among the hydrocarbon molecules, where hydrocarbons as the common and important target products from the pyrolysis of an organic matter are extensively present in the fluid mixture containing both the gas-phase component and the liquid-phase component.

The phrase "evaporation caused error" used herein refers that a portion of the liquid-phase component, which after being cooled is of a boiling point close to the room temperature or exhibits strong volatility, such as methanol, ethanol, and C5 hydrocarbons, will escape from the liquid-phase component together with a portion of the gas-phase component dissolved in the liquid-phase component during sample injection and detection after gas-liquid separation, thus leading to an evaporation caused error during measurement.

In a first aspect, the present disclosure provides in embodiments a system for detecting a fluid mixture. As shown in FIG. 1, the system (also referred to as the detection system herein) includes the pipeline assembly 10, the first valve 21, the gas chromatograph 30 and the vacuum pump 40. The pipeline assembly 10 includes the first pipeline 11 and the second pipeline 12. The first valve 21 is connected to the first pipeline 11, and controls a flow of the fluid mixture obtained from a reaction in the reactor 80. The gas chromatograph 30 is provided with the sample injection end 31 and the sample output end 32. The sample injection end 31 is connected to an end of the first pipeline 11 away from the first valve 21, and the sample output end 32 is connected to the second pipeline 12. The vacuum pump 40 is connected to an end of the second pipeline 12 away from the gas chromatograph 30.

It should be noted that the system for detecting a fluid mixture in embodiments of the present disclosure is particularly suitable for, but not limited to, a fluid mixture (including both a gas-phase component and a liquid-phase component) resulted from pyrolysis under high-temperature and high-pressure and having significantly different boiling points. The system for detecting a different fluid mixture also fall within the protection scope of the present disclosure. For example, the system provided in embodiments of the present disclosure is also applicable to a pure gas-phase mixture, a pure liquid-phase mixture, or a fluid mixture that is not at high-temperature. In order to facilitate understanding, the detection of the fluid mixture obtained from pyrolysis under high-temperature and high-pressure in the reactor 80 is described below.

According to embodiments of the present disclosure, the method includes turning off the first valve 21, vacuuming the pipeline assembly 10 and the gas chromatograph 30 with the vacuum pump 40, and turning on the first valve 21, thus resulting in a pressure difference between upstream and downstream of the first valve 21 that enables the fluid mixture to enter the first pipeline 11 quickly due to a lower pressure of the first pipeline 11 downstream of the first valve 21, i.e., at a side of the first valve 21 that its valve core faces the gas chromatograph 30; or reduces cooling time for the gas mixture from the reactor at high-temperature or high-temperature and high-pressure, thus avoiding the cooling delay caused error. Further, liquid in the fluid mixture (as a gas-liquid mixture) will be flashed into gas under a suddenly-reduced pressure when the fluid mixture enters the first pipeline 11 with the lower pressure, such that the fluid mixture is turned into a gas mixture, thus preventing a portion of the gas-phase component from dissolving in the liquid-phase component, and thereby avoiding the gas-dissolved-in-liquid caused error. Moreover, the fluid mixture is of a reduced boiling point under the lower pressure, thus preventing the evaporation caused error where the component with a boiling point close to room temperature or exhibiting strong volatility is inhibited from evaporation and escape, such that all the fluid mixture obtained from the reaction is gasified and directly injected into the gas chromatograph 30, thereby achieving online detection by the gas chromatography with minimized error occurring during measurement.

It should be noted that the term "flash" used herein refers to a phenomenon where a saturated liquid at high-pressure enters a relatively low-pressure container, and the saturated liquid becomes in part a saturated vapor under the container's pressure due to a sudden decrease in pressure In some embodiments, as shown in FIG. 1, the system further include the syringe 50 and the cooler 60. The syringe 50 is provided with a first end inserted into the reactor 80 and a second end connected to the first valve 21. The cooler 60 sleeves around the syringe 50.

In an embodiment, the syringe 50 is a micro syringe with a diameter and a length that are small enough to avoid interference to the pyrolysis of the raw material in the reactor 80, and to prevent a prolonged residence of a sample to be collected (i.e., the fluid mixture) in the syringe 50, due to its excessive volume. In an embodiment, the cooler 60 is a micro cooler, allowing a small amount of the fluid mixture, resulted from the pyrolysis of the raw material under high-temperature and high-pressure, to be instantaneously cooled down before enter the first pipeline 11 along the syringe 50 via the first valve 21, driven by a huge pressure difference between upstream and downstream of the first valve 21, in specific a valve core of the first valve 21. The micro cooler as the cooler 60 is adjustable to ensure that the fluid mixture after being cooled is of a temperature of 473K or below for entering the first valve 21, thereby avoiding a pyrolysis reaction under a preset-deviated operating condition instantaneously. The instantaneous cooling and flash under low-pressure avoid the cooling delay caused error during measurement due to delayed termination of the pyrolysis reaction after the fluid mixture leaves the reactor 80.

In some embodiments, the system further includes a pulse power supply connected to the first valve 21 and configured to drive the first valve 21 to turn-on and turn-off alternately. In an embodiment, the first valve 21 is a fast electromagnetic valve, driven by the pulse power supply, whose pulse signal is of a pulse width (PW) less than 10 ms, to turn-on and turn-off alternately at a frequency of 1-10 Hz. Every time the first valve 21 is turned-on (i.e., the valve core in the first valve 21 is opened), a small amount of the fluid mixture instantaneously passes through the cooler 60 and enters the first pipeline 11 along the syringe 50 via the first valve 21 under the huge pressure difference between upstream and downstream of the valve core in the first valve 21. In an embodiment, the first valve 21 is driven to turn-on and turn-off alternately for sample injection, such that the fluid mixture is uniformly distributed throughout the pipeline assembly 10.

In some embodiments, the first valve 21 is of a maximum tolerate temperature of 553 K for the valve core, a tolerate pressure of 10 MPa for a high-pressure input end, and a vacuum-workable pressure for a low-pressure output end. In an embodiment, the first valve 21 is driven by the pulse power supply at a high frequency under a voltage of 24 V with the PW less than 10 ms, such that the first valve 21 is turned-on and turned-off within 10 ms. It would be understood that the first valve 21 is adjustable for an opening degree and an opening duration by controlling the voltage and the PW of the pulse power supply.

In some embodiments, as shown in FIG. 1, the system further includes the second valve 22 arranged at the second pipeline 12 and located between the vacuum pump 40 and the gas chromatograph 30. In an embodiment, the second valve 22 is a one-way valve with a flow direction from the gas chromatograph 30 to the vacuum pump 40 along the second pipeline 12, allowing the fluid mixture to flow from the gas chromatograph 30 to the vacuum pump 40 via the one-way valve, while disallowing the fluid mixture to flow from the vacuum pump 40 to the gas chromatograph 30, thus preventing the fluid mixture pumped by the vacuum pump 40 from flowing back to the gas chromatograph 30, thereby further reducing the error occurring during measurement.

In some embodiments, the second valve 22 is of a threshold pressure lower than a saturated vapor pressure of a component with a highest boiling point in the fluid mixture. As a one-way valve, the second valve 22 is of a threshold pressure determining the second valve 22 to turn-on for allowing flow-through only on a condition that the second pipeline 12 upstream of the second valve 22 (i.e., at a side of the second valve 22 that its valve core faces the gas chromatograph) is of a pressure greater than or equal to the threshold pressure of the second valve 22. In contrast, the second valve 22 is not turned on, based on the second pipeline 12 upstream of the second valve 22 is of a pressure lower than the threshold pressure of the second valve 22. It would be appreciated that the second valve 22 is adjustable for the threshold pressure, for example in an embodiment, the second valve 22 is set to be of the threshold pressure lower than the saturated vapor pressure of the component with the highest boiling point in the fluid mixture. In a specific embodiment, the one-way valve is adjusted to be of a turn-on threshold pressure $P_{threshold}$ lower than a saturated vapor pressure $P_{saturated}$ of a component A, which is most difficult to volatilize and thus having the saturated vapor pressure $P_{saturated}$ lower than that of any other components in the pipeline assembly 10, among the fluid mixture to be collected that is resulted from the pyrolysis under high-temperature and high-pressure and has significantly different boiling points, thereby ensuring the fluid mixture entering the first pipeline 11 by sample injection to be flashed completely.

In some embodiments, the system further includes a heating element (not shown in drawings) arranged at the first valve 21, the second valve 22, the pipeline assembly 10, and the gas chromatograph 30 to heat their respective surfaces in contact with the fluid mixture. In some specific embodiments, except for the syringe 50 and vacuum pump 40, the heating element is arranged at each of the first valve 21, the gas chromatograph 30, the second valve 22, and the pipeline assembly 10 to heat their respective wet surfaces (i.e., respective inner surfaces that the fluid mixture flows through and comes into contact with) to a set preheating temperature and to maintain said temperature constant, thus preventing the fluid mixture from condensing into liquid, thereby further reducing the error occurring during measurement. In some embodiments, the heating element is a thermoelectric couple or a heating wire.

In an embodiment, the heating element is the thermoelectric couple, which is equipped at respective inner surfaces of the first valve 21, the pipeline assembly 10, the gas chromatograph 30 and the second valve 22 by welding, for heating the respective inner surfaces to the set preheating temperature and temperature detection/control with a multi-loop proportion-integral-differential (PID) temperature control system.

Figure 2:
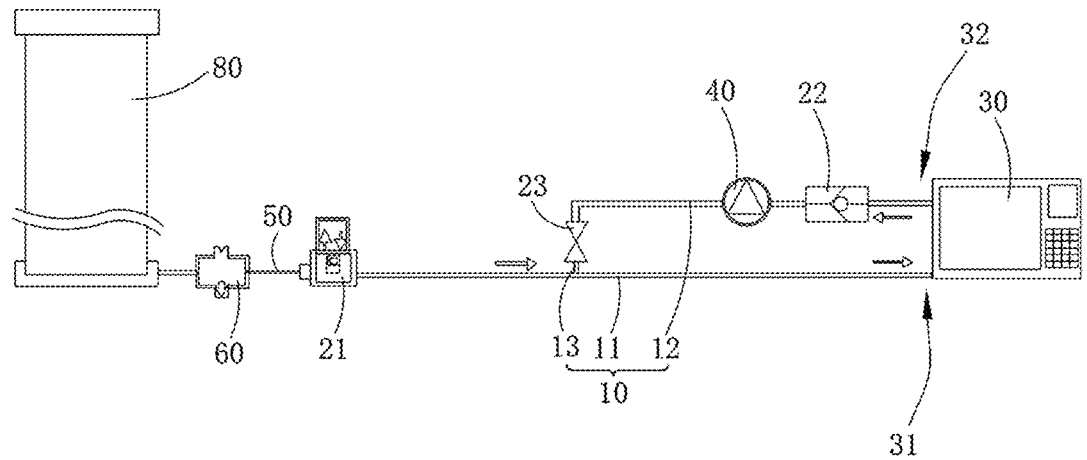
FIG. 2 is a schematic diagram showing a system for detecting a fluid mixture in other embodiments of the present disclosure.

In some embodiments, as shown in FIG. 2, the system includes a third pipeline 13 having a first end connected to the first pipeline 11 and a second end connected to the second pipeline 12; and a third valve 23 arranged at the third pipeline 13, thus facilitating to reduction of a pressure value in the pipeline assembly 10 (specifically the first pipeline 11) when the third valve 23 is turned-on during vacuuming, thereby improving vacuumization, considering a long distance from the vacuum pump 40 to the first valve 21 via the gas chromatograph 30, where the gas chromatograph 30 is provided with multiple small-diameter channels through which the fluid mixture will pass, all of which lead to poor vacuumization.

Figure 3:
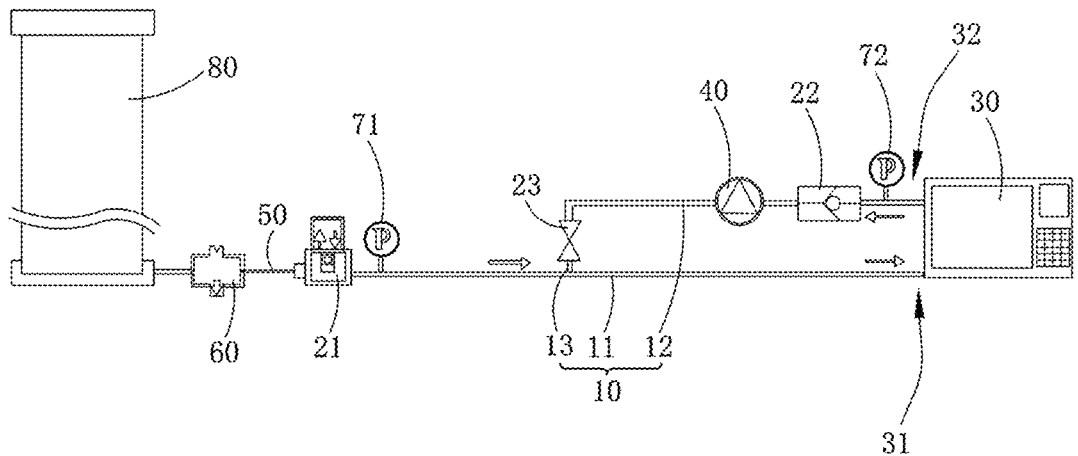
FIG. 3 is a schematic diagram showing a system for detecting a fluid mixture in yet other embodiments of the present disclosure.

In some embodiments, as shown in FIG. 3, the system further includes the first pressure sensor 71 arranged at the first pipeline 11 and the second pressure sensor 72 arranged at the second pipeline 12, wherein the first pressure sensor 71 is located between the first valve 21 and the gas chromatograph 30, and the second pressure sensor 72 is located between the vacuum pump 40 and the gas chromatograph 30.

In some embodiments, the first pressure sensor 71 and the second pressure sensor 72 are configured to monitor the pressure value (i.e., the vacuum degree) in the pipeline assembly downstream of the first valve 21 after vacuumization by the vacuum pump 40. In some embodiments, respective wet surfaces of the first valve 21, the first pressure sensor 71, the gas chromatograph 30, the second pressure sensor 72, the second valve 22, the third valve 23 and the pipeline assembly 10 are heated to the set preheating temperature and to maintained at said temperature constantly by a preheat system (including the heating element). In an embodiment, with the third valve 23 downstream of the vacuum pump 40 turned-off, the first valve 21 is driven to turn-on and turn-off alternately at a frequency of 1-10 Hz by the pulse power supply, whose pulse signal is of the PW less than 10 ms. In an embodiment, with the vacuum pump 40 kept operating, the first valve 21 is further driven to turn-on and turn-off alternately for sample injection, by controlling the turn-on threshold pressure of the second valve 22 arranged upstream of the vacuum pump 40, until the fluid mixture is uniformly distributed throughout the pipeline assembly 10 preheated. In an embodiment, with the first valve 21 and the second valve 22 turned off, the fluid mixture is detected online by the gas chromatograph 30 once respective pressure values upstream and downstream of the gas chromatograph 30 monitored by the first pressure sensor 71 and the second pressure sensor 72 achieve balance rapidly.

In some embodiments, the first pressure sensor 71 and the second pressure sensor 72 each are a pressure sensor that works under low-pressure and is resistant to high-temperature for monitoring the pressure value in the pipeline assembly 10. In some embodiments, the pipeline assembly 10 is of an absolute pressure of 100 Pa or below.

In some embodiments, the gas chromatograph 30 is provided with at least two channels for synchronous analysis of different components, where two ends of each channel are connected to the first pipeline 11 and the second pipeline 12 respectively, thereby achieving on-line and real-time synchronous analysis of the fluid mixture with significant different boiling points once injected into the multiple channels of the gas chromatograph 30.

In an embodiment, the gas chromatograph 30 is provided with three channels, equipped with a gas chromatography-mass spectrometry-hydrogen ion flame detector (GC-MS-FID), a gas chromatography-hydrogen ion flame detector (GC-FID), and a gas chromatography-thermal conductivity detector (GC-TCD) respectively, for on-line synchronous analysis of higher hydrocarbons, lower hydrocarbons and hydrogen in a sample once injected into the three channel. In another embodiment, the three channels each are further equipped with an identical volumetric apparatus (connected in serial), such that the sample is injected into the three channels from the three volumetric apparatuses for on-line detection in the gas chromatography 30 through switch of a ten-way valve after sampling and washing.

In a second aspect, the present disclosure provides in embodiments a method for detecting a fluid mixture by the system described in any one of preceding embodiments, the method including:

S100, turning-off the first valve 21;
S200, vacuuming the first pipeline 11, the gas chromatograph 30, and the second pipeline 12 with the vacuum pump 40;
S300, turning-on the first valve 21 to enable the fluid mixture to enter the first pipeline 11 for flashing into a gas mixture; and
S400, detecting the gas mixture with the gas chromatograph 30 online.

According to embodiments of the present disclosure, the method includes turning off the first valve 21, vacuuming the pipeline assembly 10 and the gas chromatograph 30 with the vacuum pump 40, and turning on the first valve 21, thus resulting in a pressure difference between upstream and downstream of the first valve 21 that enables the fluid mixture to enter the first pipeline 11 quickly due to a lower pressure of the first pipeline 11 downstream of the first valve 21, i.e., at a side of the first valve 21 that its valve core faces the gas chromatograph 30; or reduces cooling time for the gas mixture from the reactor at high-temperature or high-temperature and high-pressure, thus avoiding the cooling delay caused error. Further, liquid in the fluid mixture (as a gas-liquid mixture) will be flashed into gas under a suddenly-reduced pressure when the fluid mixture enters the first pipeline 11 with the lower pressure, such that the fluid mixture is turned into a gas mixture, thus preventing a portion of the gas-phase component from dissolving in the liquid-phase component, and thereby avoiding the gas-dissolved-in-liquid caused error. Moreover, the fluid mixture is of a reduced boiling point under the lower pressure, thus preventing the evaporation caused error where the component with a boiling point close to room temperature or exhibiting strong volatility is inhibited from evaporation and escape, such that all the fluid mixture obtained from the reaction is gasified and directly injected into the gas chromatograph 30, thereby achieving online detection by the gas chromatography with minimized error occurring during measurement.

In some embodiments, turning-on the first valve 21 includes driving the first valve 21 to turn-on and turn-off alternately with the pulse power supply, where the pulse power supply is of a pulse signal with a pulse width less than 10 ms, and the first valve 21 is driven to turn-on and turn-off alternately at a frequency of 1-10 Hz. Every time the first valve 21 is turned-on (i.e., the valve core in the first valve 21 is opened), a small amount of the fluid mixture from the reactor 80 instantaneously passes through the cooler 60 and enters the first pipeline 11 along the syringe 50 via the first valve 21 under the huge pressure difference between upstream and downstream of the valve core in the first valve 21. In an embodiment, the first valve 21 is driven to turn-on and turn-off alternately for sample injection, such that the fluid mixture is uniformly distributed throughout the pipeline assembly 10.

In some specific embodiments, as shown in FIG. 3, the method for detecting the fluid mixture includes:

S100, turning-off the first valve;
S210, vacuuming the first pipeline 11, the gas chromatograph 30, and the second pipeline 12 downstream of the first valve 21 with vacuum pump 40, and monitoring the pressure value (i.e., the vacuum degree) in the pipeline assembly 10 by the first pressure sensor 71 and the second pressure sensor 72 respectively arranged at the sample injection end 31 and the sample output end 32 of the gas chromatograph 30;
S220, heating respective wet surfaces (i.e., respective inner surfaces that the fluid mixture sampled flows through and comes into contact with) of the first valve 21, the first pressure sensor 71, the second pressure sensor 72, the gas chromatograph 30, the second valve 22, the third valve 23 and the pipeline assembly 10 to the set preheating temperature, and maintaining said temperature constant.
S310, turning off the third valve 23 arranged downstream of the vacuum pump 40, and driving the first valve to turn-on and turn-off alternately at a frequency of 1-10 Hz with the pulse power supply whose pulse signal with a pulse width less than 10 ms;

Every time the first valve 21 is turned-on (i.e., the valve core in the first valve 21 is opened), a small amount of the fluid mixture (resulted from the pyrolysis of the raw material under high-temperature and high-pressure) instantaneously passes through the micro cooler 60 and enters the first pipeline 11 has been vacuumed along the micro syringe 50 via the first valve 21 under the huge pressure difference between upstream and downstream of the valve core in the first valve 21. The fluid mixture after being cooled is of a temperature of 473K or below for entering the first valve 21, thereby avoiding the pyrolysis reaction under the preset-deviated operating condition instantaneously.

S320, keeping the vacuum pump 40 operating, and adjusting the turn-on threshold pressure of the second valve 22 arranged upstream of the vacuum pump 40 for enabling the pressure value of the pipeline assembly 10 preheated and vacuumed to be of an ultra-low pressure lower than the sample's saturated vapor pressure at the corresponding temperature, so that the fluid mixture under high-pressure entering the pipeline assembly 10 is flashed into gas; and S400, turning-on and turning-off the first valve 21 alternately for sample injection of the fluid mixture until the fluid mixture is uniformly distributed throughout the pipeline assembly 10 preheated and vacuumed; and turning-off the first valve 21 and the second valve 22, and detecting the fluid mixture online by the gas chromatograph 30 once respective pressure values upstream and downstream of the gas chromatograph 30 monitored by the first pressure sensor 71 and the second pressure sensor 72 achieve balance rapidly.

The above is only embodiments of the present disclosure, but the scope of protection of this application is not limited by them. Within the scope of the disclosed technology, any skilled in the art is able to easily think of various equivalent modifications or replacements, which should be covered within the scope of protection of the present disclosure. Therefore, the scope of protection of this invention should be based on the scope of protection of the appended claims.

What is claimed is:

1. A method for detecting a fluid mixture by a detection system, wherein the detection system comprises:
   a pipeline assembly, comprising a first pipeline and a second pipeline;
   a first valve, directly connected to an entrance to the first pipeline and controlling a flow of the fluid mixture obtained from a reaction in a reactor;
   a gas chromatograph, provided with a sample injection end connected to an end of the first pipeline away from the first valve and a sample output end connected to the second pipeline;
   a vacuum pump, connected to an end of the second pipeline away from the gas chromatograph; and
   a pulse power supply configured to output a pulse signal having a pulse width less than 10 ms, wherein the pulse power supply is connected to the first valve;
   wherein the method comprises:
   turning-off the first valve;
   vacuuming the first pipeline, the gas chromatograph, and the second pipeline with the vacuum pump;
   flashing the fluid mixture into a gas mixture at the entrance to the first pipeline by turning-on and turning-off the first valve alternately at a frequency of 1-10 Hz with the pulse signal; and
   detecting the gas mixture with the gas chromatograph online.

2. The method of claim 1, wherein the detection system further comprises:
   a first pressure sensor, arranged at the first pipeline and located between the first valve and the gas chromatograph; and
   a second pressure sensor, arranged at the second pipeline and located between the vacuum pump and the gas chromatograph;
   wherein the first pressure sensor and the second pressure sensor respectively arranged at the sample injection end and the sample output end of the gas chromatograph;
   wherein after vacuuming the first pipeline, the gas chromatograph, and the second pipeline with the vacuum pump, the method further comprises:
   monitoring a pressure value in the pipeline assembly by the first pressure sensor and the second pressure sensor.

3. The method of claim 2, wherein the detection system further comprises:
   a third pipeline, having a first end connected to the first pipeline and a second end connected to the second pipeline; and
   a third valve, arranged at the third pipeline;
   wherein during vacuuming the first pipeline, the gas chromatograph, and the second pipeline with the vacuum pump, the method further comprises:
   turning on the third valve to reduce the pressure value in the pipeline assembly.

4. The method of claim 2, wherein detecting the gas mixture with the gas chromatograph online further comprises:
   monitoring the pressure values upstream and downstream of the gas chromatograph achieving balance by the first pressure sensor and the second pressure sensor; and
   detecting the gas mixture with the gas chromatograph online.

5. The method of claim 3, wherein the detection system further comprises an additional heating element arranged at the first pressure sensor, the second pressure sensor, the third valve and the third pipeline;
   wherein the method further comprises:
   heating respective surfaces of the first pressure sensor, the second pressure sensor, the third valve and the third pipeline by the additional heating element to a set preheating temperature; and
   maintaining the temperature constant.

6. The method of claim 1, wherein the detection system further comprises:
   a second valve, arranged at the second pipeline and located between the vacuum pump and the gas chromatograph; and
   a heating element, arranged at the first valve, the pipeline assembly, the gas chromatograph, and the second valve to heat their respective surfaces in contact with the fluid mixture;
   wherein the method further comprises:
   heating respective surfaces of the first valve, the pipeline assembly, the gas chromatograph and the second valve by the heating element to a set preheating temperature; and
   maintaining the temperature constant.

7. The method of claim 6, wherein turning-on and turning-off the first valve alternately further comprises:
   keeping the vacuum pump operating; and
   adjusting a threshold pressure of the second valve to be lower than a saturated vapor pressure of a component with a highest boiling point in the fluid mixture, driving the first valve to turn-on and turn-off alternately.

8. The method of claim 6, wherein the second valve is a one-way valve with a flow direction from the gas chromatograph to the vacuum pump along the second pipeline.

9. The method of claim 1, wherein the detection system further comprises:
   a syringe, having a first end inserted into the reactor and a second end connected to the first valve; and
   a cooler, sleeving around the syringe;
   wherein before turning-on and turning-off the first valve alternately, the method further comprises:

cooling the fluid mixture to a temperature of 473K or below by the cooler.

10. The method of claim 1, wherein the gas chromatograph is provided with at least two channels for synchronous analysis of different components, and two ends of each channel are connected to the first pipeline and the second pipeline respectively;
- wherein detecting the gas mixture with the gas chromatograph online further comprises:
- analyzing the different components with different boiling points in the fluid mixture synchronously in respective channels of the gas chromatograph.

11. The method of claim 10, wherein the gas chromatograph is provided with three channels equipped with a gas chromatography-mass spectrometry-hydrogen ion flame detector, a gas chromatography-hydrogen ion flame detector, and a gas chromatography-thermal conductivity detector respectively for synchronous analysis of different components.

12. The method of claim 10, wherein the at least two channels each are further equipped with an identical volumetric apparatus;
- wherein detecting the gas mixture with the gas chromatograph online further comprises:
- injecting the gas mixture into respective channels from the identical volumetric apparatus; and
- analyzing the different components with different boiling points in the fluid mixture synchronously in respective channels of the gas chromatograph.

* * * * *